United States Patent van Boekel et al.

[11] Patent Number: 5,113,576
[45] Date of Patent: May 19, 1992

[54] PROCESS FOR THE PRODUCTION OF AN INJECTION NOZZLE FOR USE IN AN INJECTION MOLDING DEVICE

[75] Inventors: Franciscus A. J. van Boekel, Rotterdam; Anthonie van den Brink, Westmaas, both of Netherlands

[73] Assignee: Eurotool B.V., 's-Gravendeel, Netherlands

[21] Appl. No.: 662,244

[22] Filed: Feb. 28, 1991

[30] Foreign Application Priority Data

Mar. 1, 1990 [NL] Netherlands .................. 9000488

[51] Int. Cl.⁵ .................................................. H05B 3/00
[52] U.S. Cl. ...................................... 29/611; 29/447; 219/422; 392/480; 425/545; 425/549
[58] Field of Search ................ 29/611, 447, 525; 425/547-549, DIG. 129; 222/146.5; 392/480; 219/421, 422; 403/334

[56] References Cited

U.S. PATENT DOCUMENTS

| | | | |
|---|---|---|---|
| 2,464,908 | 3/1949 | Volkmann | 29/525 |
| 4,268,241 | 5/1981 | Rees et al. | 425/549 |
| 4,478,780 | 10/1984 | Kim | 425/549 |
| 4,558,210 | 12/1985 | Leary | 219/535 |
| 4,649,262 | 3/1987 | Yoshikawa | 219/421 |
| 4,955,804 | 9/1990 | Martell et al. | 219/421 |

FOREIGN PATENT DOCUMENTS

0093231 11/1983 European Pat. Off. .

OTHER PUBLICATIONS

"Standardisiertes Schmelzeleitsystem fur Grosswerkzeuge", *Plastverarbeiter*, vol. 38, No. 12, Dec., 1987, by R. Lohl, pp. 106–116.

*Primary Examiner*—P. W. Echols
*Attorney, Agent, or Firm*—Young & Thompson

[57] ABSTRACT

A process for the production of an injection nozzle comprising an essentially tubular inner part (16) and at least one essentially wire-type heating element (14, 15) which is embedded entirely inside a solid metal body (12, 13) lying in a close-fitting manner around the inner part in which one or more separate, essentially tubular metal bodies (12, 13) with a heating element (14, 15) embedded therein are formed by placing the heating element and the metal in a molten state in a mold, so that the heating element is completely enclosed by the molten metal, and subsequently allowing the metal to set, following which the body thus formed is removed from the mold and this tubular body or these tubular bodies thus obtained is or are then slid over the tubular inner part up to a certain point. Advantageously, a fully open axially running slit (12', 13') is formed in the wall of the tubular body (12, 13), while the wire-type heating element (14, 15) extends in curved loops running zigzag through the body and extending to the slit.

6 Claims, 2 Drawing Sheets

PROCESS FOR THE PRODUCTION OF AN INJECTION NOZZLE FOR USE IN AN INJECTION MOLDING DEVICE

BACKGROUND OF THE INVENTION

The invention relates to a process for the production of an injection nozzle for use in a device for molding an object of a thermoplastic material in an injection mold, which nozzle comprises an essentially tubular inner part forming a feed channel for the thermoplastic material, and at least one essentially wire-type heating element which is situated at a distance from the inner part and which is fitted extending over a certain length of the inner part and running several times essentially round the inner part, and which is embedded entirely inside a solid metal body lying in a close-fitting manner around the inner part, which body is obtained by placing the heating element and said metal in a molten state in a mold, so that the heating element is completely enclosed by the molten metal, and subsequently allowing the metal to set, following which, the body thus formed is removed from the mold. Such a process is known from European Patent Application 0093231.

In the known process the injection nozzle is made in one piece, by placing a helically wound heating element in a mold, then fitting a solid metal bar in this heating element, and then pouring molten metal into the annular space around the bar inside the mold and allowing it to set, following which, the nozzle thus formed is removed from the mold and a passage is finally drilled through the bar in order to form the feed channel.

A nozzle obtained in this known manner has the disadvantage that the temperature distribution over the nozzle obtained by means of the single heating element cannot be set in the optimum manner for certain thermoplastic materials with a critical temperature range.

OBJECT OF THE INVENTION

The object of the invention is to provide a process by means of which improved injection nozzles of the above-mentioned type which do not have the above-mentioned disadvantage can be produced.

SUMMARY OF THE INVENTION

This object is achieved in that in the process according to the invention one or more essentially tubular metal bodies with a heating element embedded therein are formed in the manner mentioned in the preamble, and this tubular body or these tubular bodies thus obtained is or are then slid over the tubular inner part up to a certain point.

By the process according to the invention one or more of the above-mentioned tubular bodies or heating bodies can now be fitted round the tubular inner part at such a selected place or places that the temperature distribution over the nozzle is optimum for a specific thermoplastic material. Moreover, these heating bodies can be replaced in a simple manner.

For fixing the heating bodies at a particular point around the tubular inner part, at least a part of the inner peripheral face of a heating body and the outer peripheral face of at least a part of the tubular inner part are made so that they run tapered to the same degree, following which the heating body is slid over the inner part in such a way that the taper of the first-mentioned peripheral face is directed identically to that of the other peripheral face, so that towards the end of the sliding movement these faces interact as wedges.

The inner peripheral face of the tubular body is preferably made cylindrical and a fully open axially running slit is formed in the wall of the body, while the wire-type heating element extends in curved loops running zigzag through the body.

If it fits in a sliding fit around the cylindrically shaped tubular inner part, such a body can then simply be slid up to a certain point over the tubular inner part. When a nozzle obtained in this way is in operation, in which case an electric current is passed through the heating element of the tubular body, in order to maintain the hot thermoplastic material flowing through the nozzle at the right temperature, more heat is given off by the tubular heating body inwards to the tubular inner part than outwards, with the result that the temperature of the inner peripheral part of the body becomes lower than that of the outer peripheral part, as a result of which the inner peripheral part contracts, so that the tubular body is clamped firmly around the tubular inner part.

In another case, the outer peripheral face of the tubular body can be made tapering and, after it is slid to a particular point over the tubular inner part, a clamping sleeve having a tapering inner peripheral face can be slid over said body. In this way, the tubular body is clamped around the tubular inner part by the wedging effect of the above-mentioned peripheral faces, so that the tubular body can fit around the cylindrical outer peripheral face of the tubular inner part with a looser fit than a sliding fit. In this case, the outer peripheral face of the heating body and the inner peripheral face of the clamping sleeve can advantageously be provided with a surface roughness approximately in the form of a helical screw thread with large pitch, so that the clamping force is increased by rotating the clamping sleeve.

It will be clear that it is also possible to form the heating body in such a way that it fits in a force fit around the cylindrical outer peripheral face of the inner part and, only after such a temperature difference between the inner and outer peripheral surfaces of the tubular body is produced that the temperature at the inner peripheral surface is higher than that at the outer peripheral surface so that the tubular body widens, to slide said body up to a certain point over the tubular inner part and subsequently to eliminate the above-mentioned temperature difference again, as a result of which the tubular body narrows and grips round the tubular inner part.

In particular, if several tubular bodies or heating bodies situated at a distance from each other are fitted round the tubular inner part, one or more generally tubular filling bodies are advantageously slid over the tubular inner part before and/or after a heating body is slid up to a certain point over the tubular inner part.

BRIEF DESCRIPTION OF THE DRAWINGS

The invention is explained in further detail with reference to the drawing, in which.

DESCRIPTION OF THE PREFERRED EMBODIMENTS

Figure 1:
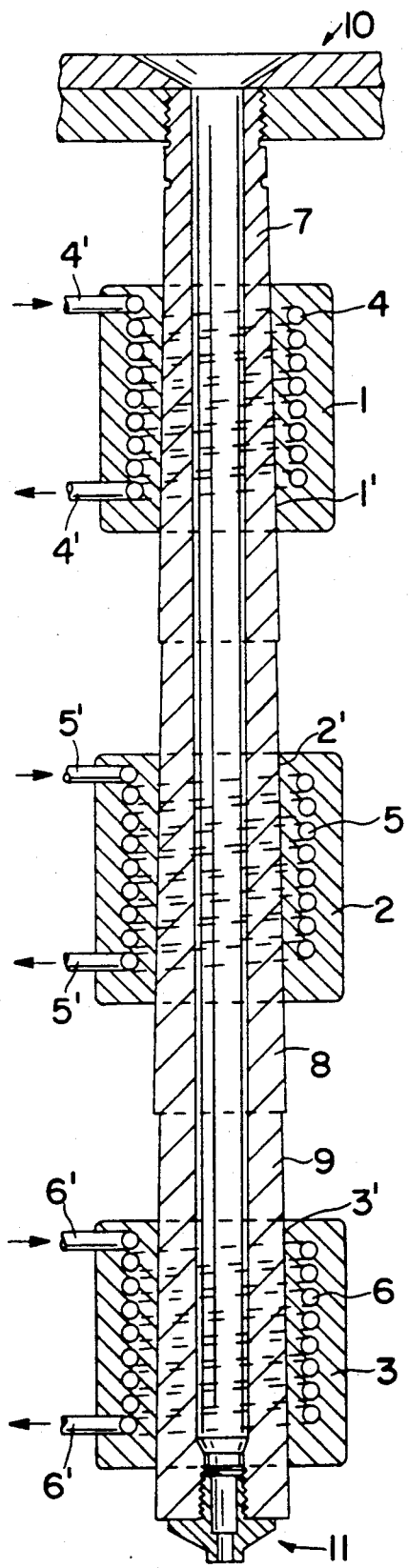
FIG. 1 shows an injection nozzle obtained by the process according to the invention, in axial cross-section.

As shown in FIG. 1, the injection nozzle comprises three heating bodies 1, 2 and 3, each comprising a tubular solid metal body in which a coiled heating element 4, 5, 6 is embedded, said heating elements having outwardly projecting connecting parts 4', 5', 6' for connection of the heating elements to an electric power source (not shown). Each of the heating bodies 1, 2, 3 is formed in advance by placing a coiled heating element 4, 5, 6 in a preheated annular mold cavity and pouring liquid metal into it, either by atmospheric casting or by injection molding, and then allowing said metal to set, following which the body thus formed is removed from the mold cavity. The inner periphery 1', 2', 3' of the heating body is then taper-drilled.

The heating body 1, 2, 3 thus obtained is then slid over a tubular part, in which the outer peripheral faces 7, 8, 9 of the tubular part are made tapering, so that through the wedging effect of the inner peripheral faces 1', 2', 3' with the corresponding tapering outer peripheral face 7, 8, 9 of the tubular part, the bodies 1, 2 and 3 come to lie tightly around the parts 7, 8, 9 respectively.

The top end of the part 7 of the tubular inner part can be screwed tightly into a connecting piece 10 of the injection mold (not shown). The bottom end of the part 9 of the tubular inner part is provided with a jet passage 11.

Figures 2, 3:
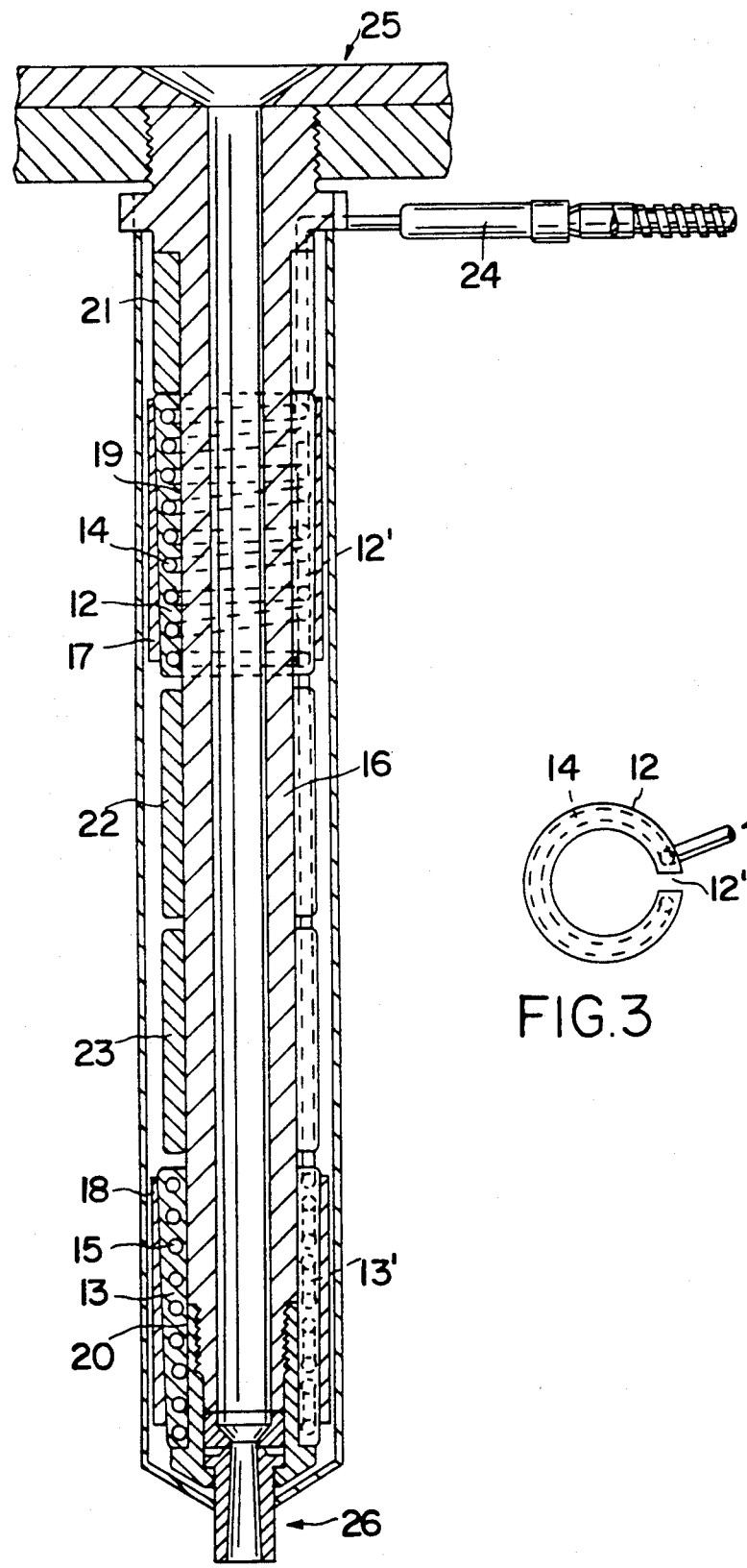
FIG. 2 shows a second embodiment of an injection nozzle obtained by the process according to the invention, in axial cross-section.
FIG. 3 shows a heating body of the injection nozzle according to FIG. 2, in top view.

During the production of the injection nozzle shown in FIGS. 2 and 3 the heating bodies 12 and 13 are first produced by pouring molten metal into a preheated mold cavity in the manner described above. However, in this case the heating elements 14, 15 extend in curved loops running zigzag through the body 12, 13, so that the loops, viewed in the axial direction, leave between them an axially extending part of the metal body, which part serves to form a continuous axial gap 12', 13', which gap can be formed by sawing it out or through the mold cavity already having a facility for this.

The outer peripheral face of the bodies 12, 13 is also tapered, either in the mold cavity or by a finishing operation.

The bodies 12 and 13 thus formed are then slid over a tubular inner part 16 up to a certain point. Then the clamping sleeves 17 and 18 are slid over the bodies 12 and 13 respectively, the inner peripheral faces of said sleeves being tapered, so that the wedging effect between said inner surfaces with the tapering outer surfaces of the bodies 12, 13 causes the tubular bodies 12, 13 to be clamped firmly around the tubular part 16. The clamping sleeves are not, however, necessary. The bodies 12, 13 can also have a purely cylindrical outer peripheral face and be slid in a sliding fit up to a certain point over the inner part, since when the nozzle is in operation these bodies are clamped firmly around the inner part through the temperature differences between the inner and outer peripheral parts as described hereinabove.

Axially split sleeves 19, 20 of a readily conducting metal, for example copper, can, if necessary, also be fitted between the bodies 12, 13 and the tubular inner part 16. The filling bodies 21, 22 and 23 provided with an axially running gap can also be slid over the tubular inner part 16, which bodies can be made of, for example, aluminum.

The heating elements 14, 15 can be connected by means of the connecting pieces 24 to an electric power source. The heating elements are interconnected by wiring extending through the axially running gaps in the filling bodies 21, 22, 23 and the heating elements 12, 13.

The top end of the injection nozzle thus formed can be screwed into a connecting piece 25 of an injection mold, while a jet passage 26 is provided at the bottom end of the tubular inner part 16.

We claim:

1. Process for the production of an injection nozzle for use in a device for molding an object of a thermoplastic material in an injection mold, which nozzle comprises an essentially tubular inner part forming a feed channel for the thermoplastic material, and at least one essentially wire-type heating element which is situated at a distance from the tubular inner part and which is fitted extending over a certain length of the inner part and running several times essentially around the inner part, and which is embedded entirely inside a solid metal tubular body lying in a close-fitting manner around the inner part, said body being obtained by placing the heating element and said metal in a molten state in a mold, so that the heating element is completely enclosed by the molten metal, and subsequently allowing the metal to set, thereafter, removing the essentially tubular metal body thus formed from the mold, and sliding over the tubular inner part up to a particular point, one thusly obtained tubular metal body having a heating element embedded therein, said body having a fully open axially running slit formed in its wall, while the wire-type heating element extends in curved loops running zigzag through the body and extending to the slit.

2. Process according to claim 1, wherein the tubular body has an outer peripheral face, which is made tapering and, after the tubular body is slid to a particular point over the tubular inner part, a clamping sleeve having a tapering inner peripheral face is slid over said body, so that the tubular body is firmly clamped around the tubular inner part by a wedging effect of said inner and outer peripheral faces.

3. Process according to claim 2, wherein the outer peripheral face of the tubular body and the inner peripheral face of the clamping sleeve are provided with a surface roughness approximately in the form of a helical screw thread with large pitch.

4. Process according to claim 1, wherein the tubular body is designed in such a way that it fits around a cylindrical outer peripheral face of the tubular inner part with a sliding fit.

5. Process according to claim 1, wherein the tubular body is designed in such a way that it fits around a cylindrical outer peripheral face of the tubular inner part with a force fit, and wherein a temperature difference is produced between the inner and outer peripheral surfaces of the tubular body so that the temperature at the inner peripheral surface is higher than that at the outer peripheral surface so that the tubular body widens to allow said tubular body to slide to a particular point over the tubular inner part, and that after the tubular body is slid to said particular point, the temperature difference is eliminated.

6. Process according to claim 1, wherein one or more generally tubular filling bodies are slid over the tubular inner part before and/or after a tubular body is slid up to a particular point over the tubular inner part.

* * * * *